United States Patent [19]

Haraguchi et al.

[11] Patent Number: 4,539,957
[45] Date of Patent: Sep. 10, 1985

[54] IGNITION TIMING CONTROL SYSTEM FOR INTERNAL COMBUSTION ENGINES

[75] Inventors: Hiroshi Haraguchi, Oobu; Ko Narita; Toshiharu Iwata, both of Aichi, all of Japan

[73] Assignee: Nippondenso Co., Ltd., Kariya, Japan

[21] Appl. No.: 414,578

[22] Filed: Sep. 3, 1982

[30] Foreign Application Priority Data

Sep. 7, 1981 [JP] Japan .................................. 56-139733

[51] Int. Cl.³ .................................................. F02P 5/04
[52] U.S. Cl. .......................................... 123/425; 73/35
[58] Field of Search ............... 123/425, 427, 415, 416; 73/35

[56] References Cited

U.S. PATENT DOCUMENTS 4,002,155  1/1977  Harned et al. .
4,257,364  3/1981  Sawada et al. ..................... 123/425
4,345,558  8/1982  Yamaguchi et al. ................. 123/425
4,382,429  5/1983  Enoshima et al. .................. 123/425

Primary Examiner—Tony M. Argenbright
Attorney, Agent, or Firm—Cushman, Darby & Cushman

[57] ABSTRACT

In a system for retarding an ignition timing of the engine depending on a signal from a knock detector, the knocking intensity and the knocking frequency are discriminated in accordance with the signal of the knock detector. On the basis of the discriminated results, the system provides a small amount of retard angle for ignition timing per one knocking when the knocking frequency is low, that is, the interval between knocking signals is long and the intensity of knocking is light. On the contrary, the system provides a large amount of retard angle when the interval is short and the intensity is heavy.

5 Claims, 27 Drawing Figures

IGNITION TIMING CONTROL SYSTEM FOR INTERNAL COMBUSTION ENGINES

BACKGROUND OF THE INVENTION

The present invention relates to an ignition timing control system for internal combustion engines in which a knocking is detected from a vibration or a noise caused in or outside of a cylinder of an internal combustion engine by the pressure in the cylinder, and the ignition timing is retarded by a knocking signal detected.

In recent years, various investigations have been made into what is called the knocking feedback system for detecting a knocking caused in an internal combustion engine thereby to retard the ignition timing. Such a system will be described briefly. Vibrations or noises which are caused in or outside of a cylinder of an internal combustion engine by the pressure in the cylinder are detected, and when a vibration or a noise exceeds a set level (a knocking decision level), a knocking is decided, thereby generating a knocking signal. In the presence of this knocking signal, the ignition timing is retarded, while in the absence thereof, the ignition timing is advanced, so that the ignition timing is always controlled almost to the knocking limit, thus improving the fuel economy and output performance of the engine.

In this knocking feedback system, the ignition timing is retarded, upon detection of each knocking, generally by about 1° cA. The amount of retardation per knocking is an important factor relating to the controllability of the ignition timing. Generally, with the decrease in the amount of retardation, the stability of ignition timing is increased, while the knocking noise increases especially in the transient period such as acceleration, thereby extremely deteriorating the operating performance under the transient conditions. If the amount of retardation is increased to some degree, on the other hand, the operating performance under the transient conditions is improved but the stability of ignition timing under normal operating conditions is deteriorated, thus deteriorating the running performance under normal operating conditions. The amount of retardation corresponding to an unsatisfactory compromise between the performance under normal operating conditions and transient conditions is actually employed, or the amount of retardation is determined by ignoring one of the two conditions (normally, the transient conditions). In this conventional system, the operating performance under the normal or transient operating conditions is unavoidably deteriorated.

SUMMARY OF THE INVENTION

The present invention has been developed in view of the above-mentioned disadvantage, and an object thereof is to provide an ignition timing control system for internal combustion engines, in which intervals and intensity of knockings are detected from an output signal of a knocking detector, and these two detected data are used to decide the normal or transient conditions of the engine, so that the amount of retardation per knocking is changed accordingly.

BRIEF DESCRIPTION OF THE DRAWINGS

FIG. 9(d) is a diagram showing the response of ignition timing under transient conditions.

DESCRIPTION OF THE PREFERRED EMBODIMENTS

Figure 1:
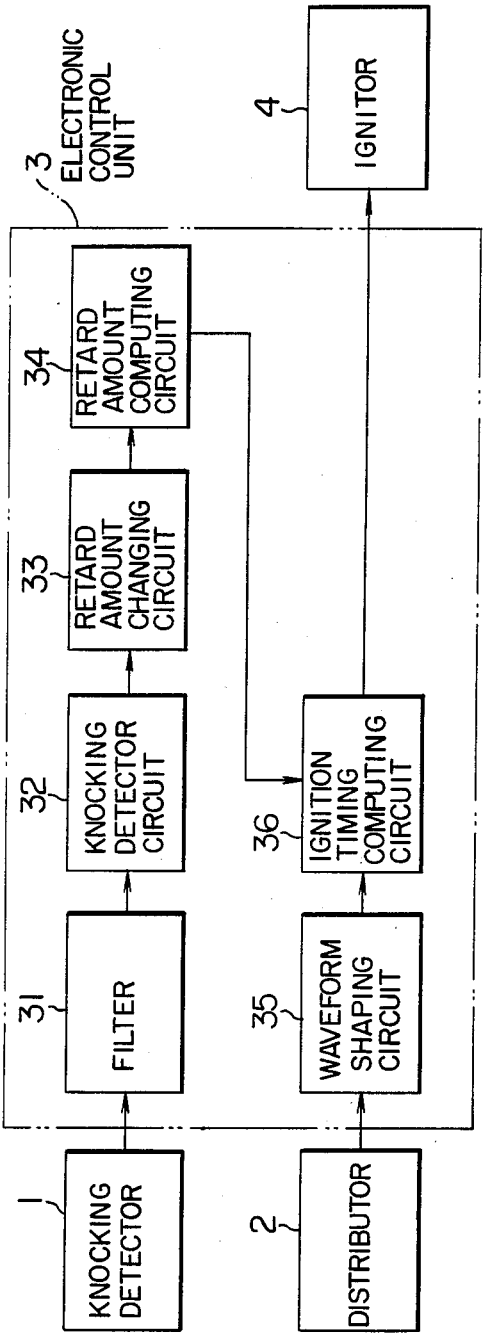
FIG. 1 is a block diagram showing an embodiment of a control system according to the present invention.

A block diagram showing an embodiment of the system according to the present invention is shown in FIG. 1. Reference numeral 1 designates a knocking detector of piezo-electricity type (including a piezo-electric element) or of electromagnetic type (including a magnet or a coil) for detecting vibrations or noises of the engine proper corresponding to a knocking thereof. Numeral 2 designates a distributor for setting a basic ignition timing of the engine, and numeral 3 an electronic control unit for determining an ignition timing and generating an ignition timing control signal in response to signals from the knock detector 1 and the distributor 2. Numeral 4 designates an ignitor for energizing and deenergizing the ignition coil (not shown) by current amplification of the signal from the control unit 3. The control unit 3 is configured as described below. Numeral 31 designates a bandpass or high-pass filter for selectively screening the knocking frequency component of the output of the knocking detector 1, numeral 32 a knocking detection circuit for detecting the presence or absence of a knocking of the engine and the intensity of the knocking and generating a corresponding knocking signal in response to an output signal of the filter 31, and numeral 33 designates a retard amount changing circuit for detecting the interval between occurring knocks or whether or not the engine knocking occurred continually in a predetermined time or predetermined cycles on the basis of the knocking signal and changing the amount of retard per knocking in response to the result of detection and the data on the knocking intensity contained in the knocking signal. Numeral 34 designates a retard amount computing circuit for computing the amount of retard behind the basic ignition timing in response to the output signal (retard amount signal) associated with the retard amount for each knocking produced from the retard amount changing circuit 33. Numeral 35 designates a waveform shaping circuit for shaping the waveform of the pickup signal produced from the distributor 2 and producing a basic ignition timing, and numeral 36 designates an ignition timing computing circuit for determining the ignition timing by subtracting the retard amount produced from the retard amount computing circuit 34 from the basic ignition timing produced from the waveform shaping circuit 35.

Figure 2:
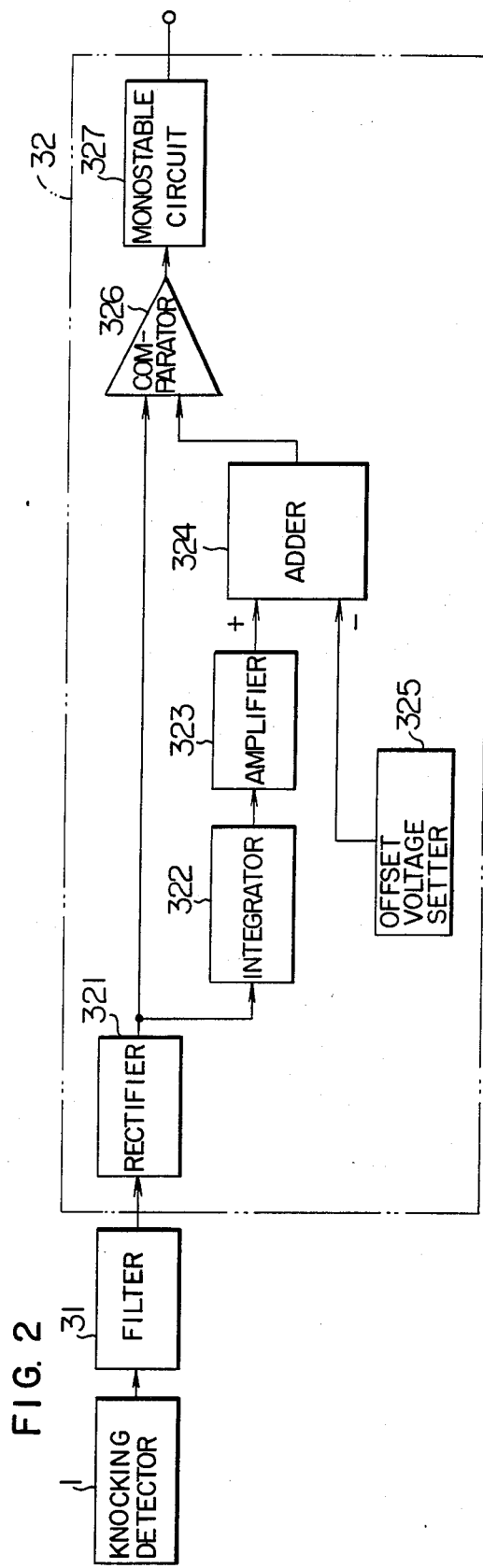
FIG. 2 is a block diagram showing a knocking detector circuit in FIG. 1.

Now, a detailed configuration of the knocking detection circuit 32 will be explained with reference to FIG. 2.

Numeral 321 designates a rectifier for halfwave rectifying the output of the filter 31; numeral 322 an integrator for integrating the output of the rectifier 321 and producing an average value of the vibration output of the knocking detector 1; numeral 323 an amplifier for amplifying the output of the integrator circuit 322 and producing a proper knocking decision level; numeral 325 designates an offset voltage setter including resistors for shifting a voltage in order to produce such an effect as a noise margin at the output of the amplifier 323; numeral 324 an adder for adding the output of the amplifier 323 and the output of the offset voltage setter 325 to each other thereby to produce a final knocking decision level; numeral 326 a comparator for comparing the outputs of the rectifier 321 and the adder 324 with each other and generating an output voltage on the assumption that a knocking has occurred when the output of the rectifier 321 is larger than the output of the adder 324; and numeral 327 a monostable multivibrator triggered by the output of the comparator 326 for continuing to produce a voltage signal for a predetermined length of time by the trigger.

Figure 3:
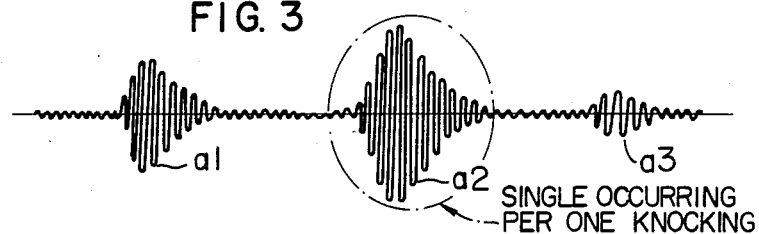
FIGS. 3(a) to 3(f) show signal waveforms for explaining the operation of the knocking detector circuit shown in FIG. 2.
Figure 3:
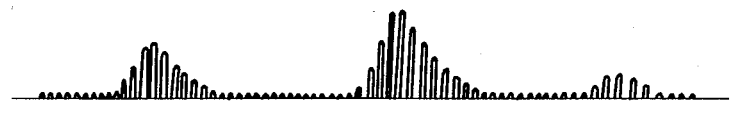
Figure 3:
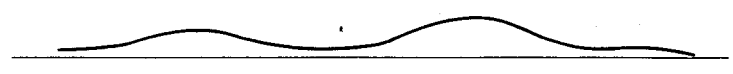
Figure 3:
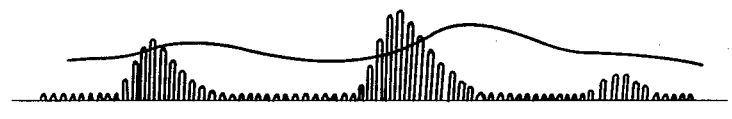
Figure 3:
Figure 3:
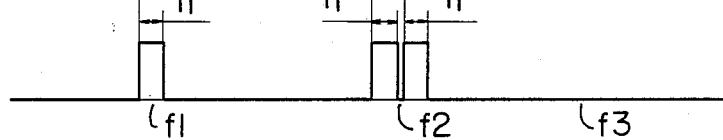

The operation of this knocking detector circuit will be explained with reference to FIG. 3. The waveform (a) of FIG. 3 shows an output signal of the filter 31, which is a signal representing the knocking frequency component of the output of the knocking detector. In the waveform (a) of FIG. 3, a1, a2 and a3 show outputs corresponding to three different knocking conditions. Specifically, a1 represents a comparatively small knocking that occurs under normal operating conditions, a2 represents a large knocking that often occurs under transient conditions and a3 represents a noise or a very small knocking. The waveform (b) of FIG. 3 shows a signal obtained by half-wave rectifying the signal of the waveform (a) of FIG. 3 by the rectifier 321, and the waveform (c) shows a signal obtained by integrating and amplifying the signal of the waveform (b) through the integrator circuit 322 and the amplifier 323. The waveform (d) shows a signal obtained by adding the offset voltage 325 to the signal of the waveform (c) by the adder 324 (namely, the knocking decision level) and includes the output signal (the waveform (b)) of the rectifier 321 plotted at the same time for comparison. The waveform (e) shows the output signal of the comparator 26 which is raised to a "high" level when the output signal of the waveform (b) is higher than the knocking decision level of the waveform (d) and is reduced to a "low" state when the output signal of the waveform (b) is smaller than the knocking decision level. In the waveform (e), numeral e1 represents a comparatively light knocking (corresponding to the signal a1 in the waveform (a)) comprised of only two pulses. Numeral e2 represents a signal produced by a heavy knocking (corresponding to the signal a2 in the waveform (a)), which is comprised of four pulses. Numeral e3, on the other hand, represents a pulse not produced in the absence of a knocking (corresponding to a3 in the waveform (a)).

In this way, pulse signals of the waveform (e) are generated in accordance with the presence or absence and the degree of intensity of a knocking.

The waveform (f) designates an output signal of the monostable multivibrator 327, which is triggered at the rise of signal of the waveform (e) and maintained at "high" level for a predetermined length of time $T_1$. The predetermined time $T_1$, which is determined by the subsequent stages of circuit configuration, is preferably 2 to 3 ms. In the waveform (f), numeral f1 shows an output corresponding to the signal e1 in the waveform (e), numeral f2 an output corresponding to signal e2 in the waveform (e), and numeral f3 an output (not an output signal, actually) corresponding to signal e3 in the waveform (e). Specifically, the signal f1 falls after being maintained at high level for the time $T_1$, and in the absence of a pulse at e1 in the waveform (e), is subsequently maintained at low level. The signal of the waveform (f) is raised to a "high" level at f2 for the time $T_1$ and then falls, followed by another rise for the time $T_1$ due to the rise of the pulse e2 of the waveform (e). Upon the subsequent fall, the low level is maintained in the absence of a pulse e2 in the waveform (e). The signal of the waveform (f) is held at "low" level in the absence of a pulse at e3 of the waveform (e) from the beginning. In this way, pulses of the waveform (f) in the number corresponding to the presence or absence and intensity of a knocking are generated, and make up knocking pulses.

A detailed configuration and the operation of the retard amount changing circuit 33 and the retard amount computing circuit 34 will be described below.

Figure 4:
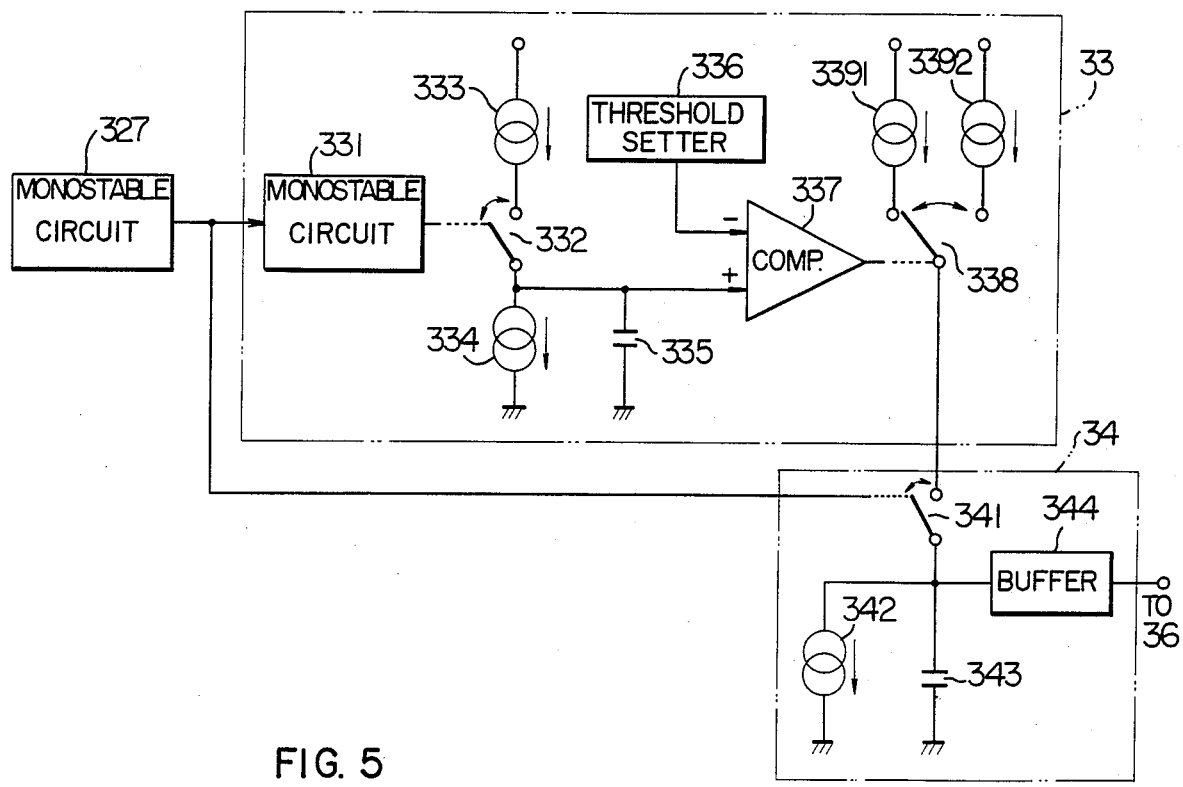
FIG. 4 is a block diagram showing a retardation amount changing circuit and a retardation amount computing circuit in FIG. 2.

A detailed configuration of the retard amount changing circuit 33 and the retard amount computing circuit 34 is shown in FIG. 4. In FIG. 4, numeral 331 designates a monostable multivibrator triggered at the fall of the monostable multivibrator 327 and maintained at "high" level during a predetermined time $T_2$. Numeral 332 designates a switch such as a transistor adapted to be closed (conduct) only during the time when the monostable multivibrator 331 is at "high" level. Numeral 333 designates a constant current source for supplying a constant current $I_1$, numeral 334 a constant current source for discharging a constant current $I_2$, numeral 335 a capacitor for charge and discharge, numeral 336 a threshold level setter for setting a predetermined threshold value, and numeral 337 a comparator for comparing the voltage level of the capacitor 335 with the threshold level produced by the setter 336, and producing a "high" level signal when the voltage level of the capacitor 335 is higher. Numerals 3391 and 3392 designate constant current sources for supplying constant currents $I_3$ and $I_4$ respectively, and numeral 338 designates a switch for switching the constant current sources 3391 and 3392 in accordance with the "high" or "low" state of the output of the comparator 337. Numeral 341 designates a switch adapted to be turned on only during the period when a knocking pulse is produced from the monostable multivibrator 327. Numeral 342 designates a constant current source for discharging a constant current $I_5$, numeral 343 a charge-discharge capacitor, and numeral 344 a buffer for introducing a stable voltage of the capacitor 343.

Figure 5:
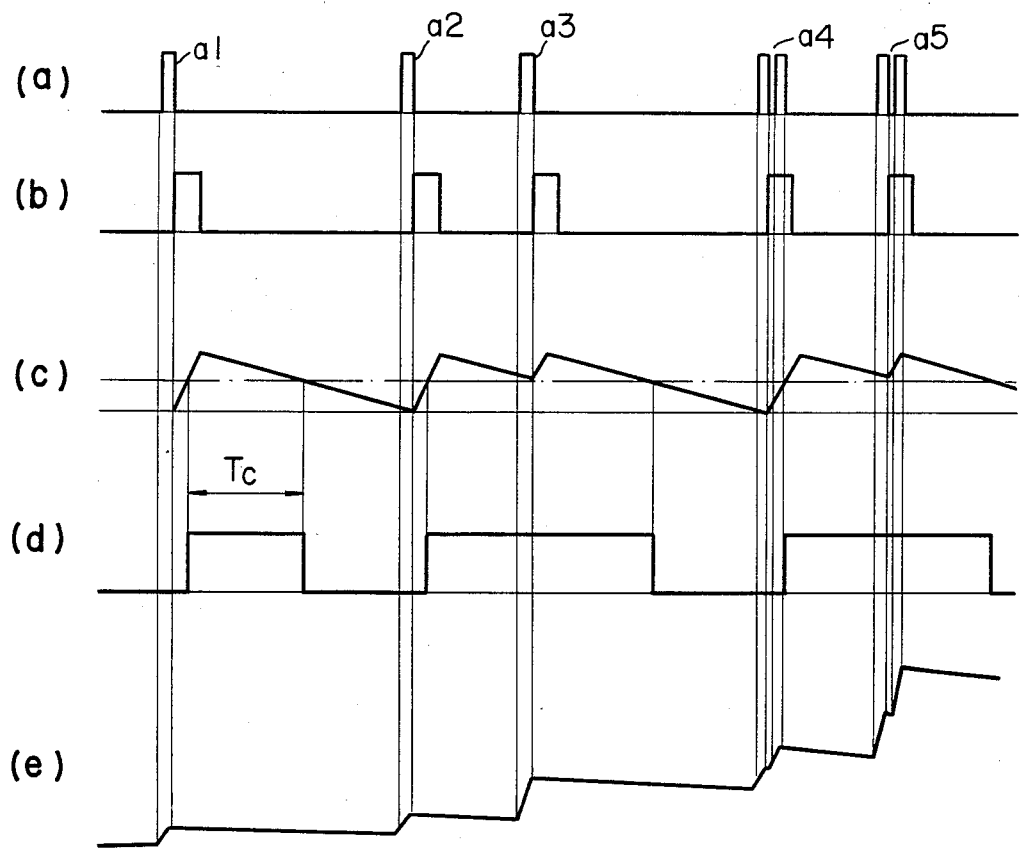
FIGS. 5(a) to 5(e) show signal waveforms for explaining the operation of the circuits shown in FIG. 4.

The operation of the retard amount changing circuit 33 and the retard amount computing circuit 34 will be explained with reference to FIG. 5. The waveform (a) shows knocking pulses produced from the monostable multivibrator 327. The waveform (b) shows an output of the monostable multivibrator 331 which is triggered at the fall of the signal of the waveform (a) and maintained at "high" level during the predetermined time $T_2$. The time $T_2$ is preferably set slightly longer than the time $T_1$ or the output signal of the waveform (b) should be set to rise a certain appropriate time after the fall of the signal of the waveform (a). In the embodiment under consideration, the time $T_2$ should be set to about 4 ms. By doing so, in the case where a knocking is strong as in the waveform (c), two or more successive knocking pulses are converted into a single pulse by the monostable multivibrator 331, so that knockings of any magnitude during a cycle are considered to be a single knocking. When the output signal of the waveform (b) of the monostable multivibrator 331 is raised to "high" state, the switch 332 conducts and the constant current $I_1$ is supplied from the constant current source 333 to the charge-discharge circuits 334 and 335. The waveform (c) shows the charge-discharge conditions of the capacitor 335. Then, the voltage level of the capacitor is compared with the threshold level set by the setter 336 by the comparator 337. This threshold level is shown by the one-dot chain of the waveform (c). The waveform (d) shows an output of the comparator 337. This signal is raised to "high" level only during the time when the voltage level of the capacitor is higher than the threshold level set by the setter 336. The time $T_c$ during which this signal is "high" is set as desired by the setting of the threshold level setter 336, the current values of the constant current sources 333 and 334 and the capacity of the capacitor 335. The signal of the waveform (d) functions as a timer for counting the predetermined time $T_c$ from the generation of a knocking. In the case where the next knocking occurs before having counted the predetermined time $T_c$, the counting of time $T_c$ is of course resumed from the time point of occurrence of such next knocking.

Depending on whether the output of the waveform (d) of the comparator 337 is "high" or "low", the switch 38 is operated to connect the constant current source 3391 or 3392. Assume that the constant current value $I_3$ is larger than the current value $I_4$. When the signal of FIG. 5(d) is at "high" level, the constant current source 3391 is connected, while when the signal of the waveform (d) is at "low" level, the constant current source 3392 is connected, so that a larger current $I_3$ may be supplied when the signal of the waveform (d) is at "high" level.

The knocking pulses of the waveform (a) produced from the monostable multivibrator 327, on the other hand, turn on the switch 341 of the retard amount computing circuit 34. Upon turning on of the switch 341, the current $I_3$ or $I_4$ determined by the retard amount changing circuit 33 is supplied to the charge-discharge circuits 342 and 343. The voltage of the capacitor 343 at this time provides the actual retard amount, which in turn corresponds to the voltage of the waveform (e).

Specifically, comparatively small knockings like a1 and a2 of the waveform (a) are caused at intervals longer than $T_c$, and the voltage increase is as small as determined by the constant current $I_4$, so that the retardation amount is small for each knocking. In the case where a knocking, even though comparatively small like a3 of the waveform (a), occurs at an interval shorter than $T_c$, on the other hand, the voltage increase is comparatively large as determined by the constant current $I_3$, resulting in the retardation amount per knocking being larger than the preceding case. Also, in the case where a large knocking as shown by a4 of the waveform (a) is caused, the retard amount twice as large as that for a1 is obtained by the two knocking pulses produced during a cycle, even though the intervals of knockings are long. When large knockings like a5 in the waveform (a) are caused at shorter intervals, the amount of retard is very large or twice that for a3. If the retard amounts determined by the currents $I_4$ and $I_3$ are assumed to be 0.3° cA and 1° cA, therefore, four retard amounts including 0.3°, 1°, 0.6° and 2° cA are obtained in the above-mentioned cases respectively. These figures may of course be set otherwise as desired.

Under the normal operating conditions where small knockings are caused mostly at long intervals, the retard amount per knocking is 0.3° cA in the above-mentioned case, or at most 0.6° cA or 1° cA even when the ignition timing is retarded considerably. Under the transient conditions where large knockings are caused at shorter intervals, by contrast, the retard amount of 2° cA is obtained. In this way, the stability under normal operating conditions and the response under transient conditions are greatly improved. If the retard amount is changed by a single factor including the intensity or intervals of knockings, however, a larger retard amount is involved even under normal operating conditions and therefore the great effect of the present invention is not attained. (See FIG. 9)

Figure 6:
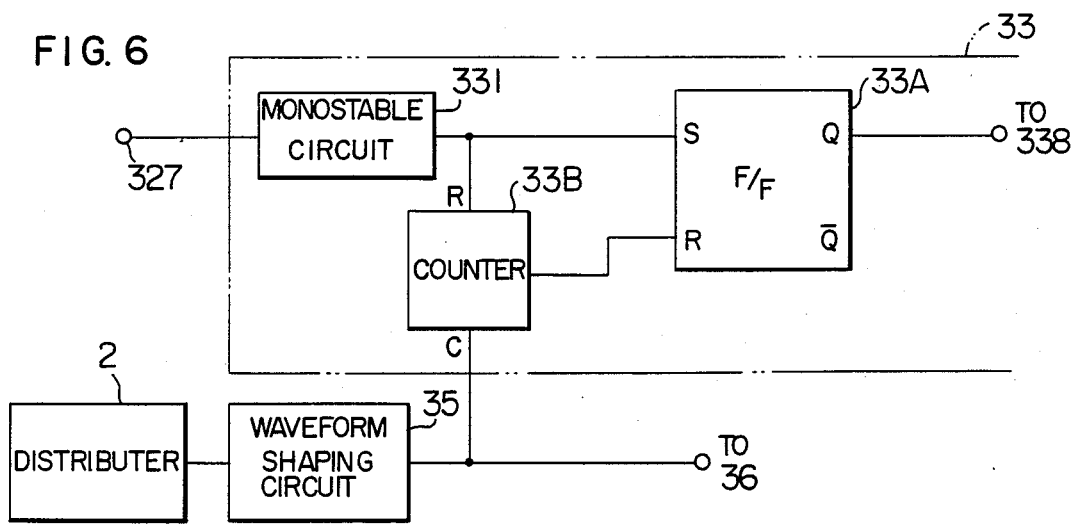
FIG. 6 is a block diagram showing a modification of the retardation amount changing circuit shown in FIG. 4.

The knocking intervals, which are determined by time in the first embodiment, may alternatively be determined by cycle as shown in a second embodiment of FIG. 6. In this case, the devices 332 to 337 in the first embodiment are replaced by an R-S flip-flop 33A and a counter 33B. The operation of the embodiment under consideration will be explained with reference to FIG. 6. A pickup signal produced from the distributor 2 is waveform-shaped by a waveform shaping circuit 35 and applied as a clock signal for the counter 33B. The pickup signal of the distributor 2 makes up a basic ignition timing signal produced in advance of the combustion cycle of each cylinder for determining the basic ignition timing of each cylinder, and therefore by counting the output signals obtained by shaping the waveform of the pickup signal at the counter 33B, it is possible to determine the number of cycles involved. If the constant of the counter 33B is set in such a way that the counter 33B is actuated by the signal of the monostable multivibrator 331 to apply a reset signal to the R-S flip-flop at a predetermined number of cycles, the R-S flip-flop is raised for a predetermined number of cycles following the occurrence of a knocking. The output of this R-S flip-flop 33A is connected to the switch 33B. The remaining operation is the same as that of the first embodiment.

Figure 7:
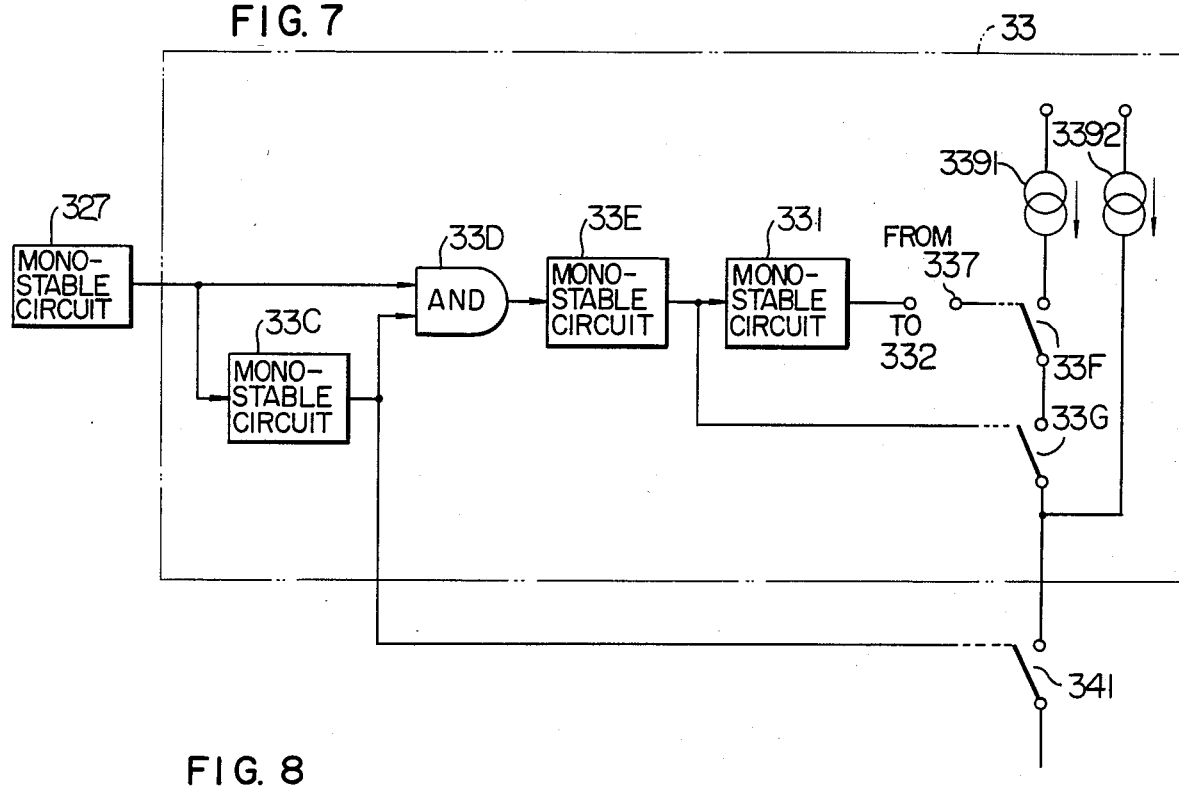
FIG. 7 is a block diagram showing another modification of the retardation amount changing circuit shown in FIG. 4.

In the first and second embodiments, the retard amount per knocking is increased both in the case where the intensity of the knocking is high and the interval of knockings is short. As an alternative, the retard amount may be increased only when a knocking of a high intensity is caused at short intervals. Such a case is shown by a third embodiment in FIG. 7.

Figure 8:
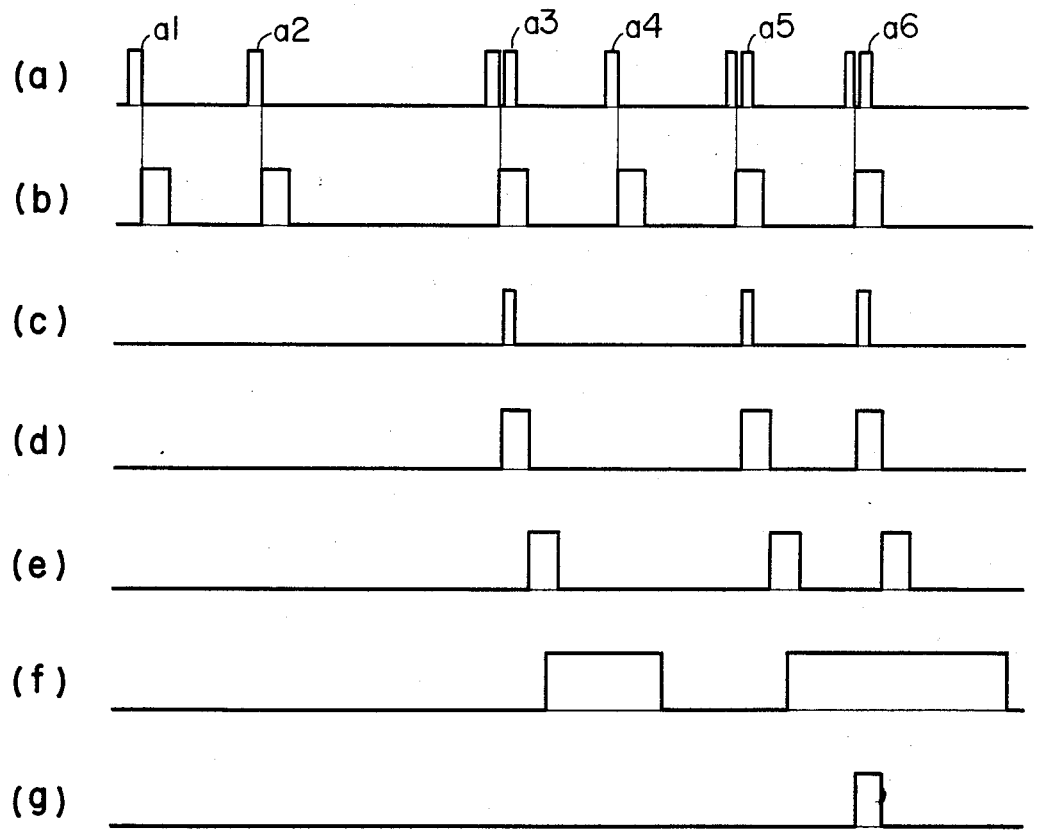
FIGS. 8(a) to 8(g) show pulse signals used for explaining the operation of the circuit shown in FIG. 7.

The configuration of this embodiment is different from that of the first and second embodiments in that a monostable multivibrator 33C, an AND circuit 33D and a monostable multivibrator 33E are additionally inserted between the monostable multivibrators 327 and 331, and the switch 338 is replaced by the switches 33F and 33G. The operation of this embodiment will be described with reference to FIG. 8.

The waveform (a) shows an output signal of the monostable multivibrator 327 containing knocking pulses a1 to a6. Among them, the knocking pulses a3, a5 and a6 are generated when a knocking intensity is high and each involves a plurality of kocking pulses in a single cycle.

The waveform (b) shows an output signal of the monostable multivibrator 33C, which is triggered at the fall of the signals of the waveform (a) and maintained "high" for a predetermined length of time. The waveform (c) shows as output of the AND circuit 33D which means a logic product of the signals of the waveforms (a)–(b) of FIG. 8. This signal (c) is maintained "high" only for the part corresponding to the knocking pulses a3, a5 and a6. The waveform (d) shows an output signal of the monostable multivibrator 33E which is triggered at the rise of the signal (c). When the signal (d) is "high", the switch 33G is turned on. The waveform (e) shows an output signal of the monostable multivibrator 331, and the waveform (f) a timer signal for counting the intervals of the knockings as described above. Specifically, the signal of the waveform (f) is an output of the comparator 337 (in FIG. 4), and when this signal is "high", the switch 33F is turned on. Thus the switches 33F and 33G are turned on simultaneously only when the signals (d) and (f) are both "high" as shown in the waveform (g). If a knocking pulse occurs when the switches 33F and 33G are both turned on, the current from the constant current sources 3391 and 3392 flow into the charge-discharge circuit, thus leading to a large retard amount. In the event that one of the switches 33F and 33G is turned off, on the other hand, only the current from the constant current source 3392 is supplied resulting in a small retard amount. In this way, only when large knockings occur at comparatively short intervals, (corresponding to signal a6), a large retard amount is obtained.

Various methods have been studied for discriminating the normal operating conditions and transient operating conditions of the engine by an output signal of the knocking detector. As a result, the method may be classified generally into two types. One is by using the intervals of knockings, and the other by using the intensity of knockings.

The first method takes advantage of the fact that the knockings occur considerably less frequently under normal operating conditions than under transient operating conditions and consequently two successive knockings are caused at longer intervals under normal operating conditions than under transient conditions.

The second method, on the other hand, uses the fact that most of the knockings occurred under normal conditions are lower in intensity than those under transient conditions.

The result of study of the first and second methods from various angles shows that although if each method is employed independently, the effect is not sufficiently high, the operating performance is greatly improved by combining the first and second methods. An example of the result of study is shown in FIG. 9.

FIGS. 9(a) to 9(c) show variations of the ignition timing under normal operating conditions, and FIG. 9(d) an ignition timing response under transient operating conditions. In all the graphs of FIGS. 9(a) to 9(d), the abscissa and ordinate represent the time and ignition timing respectively.

Figure 9:
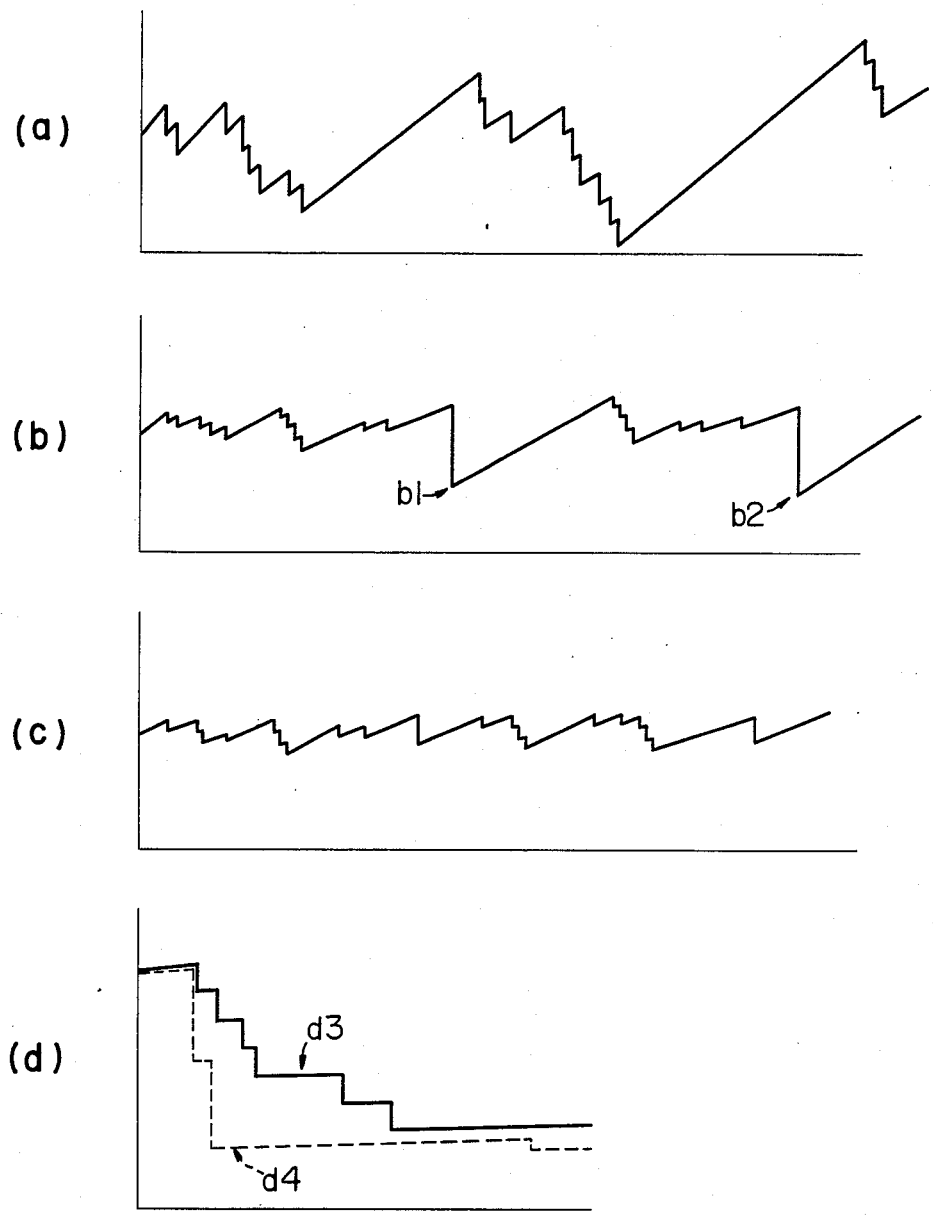
FIGS. 9(a) to 9(d) are diagrams showing the change of ignition timing under normal operating conditions of the internal combustion engine.

In the drawings, FIG. 9(a) represents a conventional method, and FIG. 9(b) the case where one of the first and second methods is used, and FIG. 9(c) the method of the present invention. It is seen that the stability of ignition timing is increased in FIG. 9(b) as compared with FIG. 9(a) although great variations remain at b1 and b2 in FIG. 9(b). In the case of the present invention as shown by FIG. 9(c) by contrast, the stability under normal operating conditions is greatly improved as compared with the cases of FIGS. 9(a) and 9(b). This is explained by the fact that even under normal operating conditions, knockings may occur at shorter intervals or at a higher intensity, so that individual data fail to offer a sufficient criterion for discriminating the normal and transient operating conditions. In the method of the present invention, by contrast, the normal and transient operating conditions are discriminated by the two data and therefore complete separation is made possible. FIG. 9 (d) shows transient responses for the conventional method (d3) and the present invention (d4). From this graph, it is seen that the response is remarkably improved in the present invention over the conventional method.

It will thus be understood that according to the present invention, the stability under the normal operating conditions and the response under the transient operating conditions are both improved remarkably.

We claim:

1. An ignition timing control system for internal combustion engines, comprising:
   a knocking detector for detecting the presence of knocks of the engine to produce a knock signal and;
   an electronic control unit for controlling the ignition timing from the knock signal produced by said knocking detector, including,
   first discrimination means for discriminating at least two intensities of knocks from the knock signal of said knocking detector,
   second discrimination means for discriminating the interval between a knock cycle and a succeeding knock cycle, which is decided as having knocks, and
   means responsive to the outputs of said first and second discrimination means for providing a small amount of retard angle for ignition timing per one knocking when said interval is long and said intensity is light, and for providing a large amount of retard angle for ignition timing per one knocking when said interval is short and said intensity is heavy.

2. An ignition timing control system comprising:
   a knocking detector for dectecting an engine knocking and;
   an electronic control unit for controlling the ignition timing from a detection signal produced by said knocking detector,
   said control unit discriminating the intensity of knock from the detection signal,
   said control unit further discriminating the interval between occurring knocks, and
   said control unit still further varying the retard angle amount per one knocking in accordance with both of said discriminating results, said control unit comprising:
   a knocking detector circuit for detecting the presence and absence of a knocking and the intensity thereof in response to a detection signal produced from said knocking detector, said knocking detector circuit including a rectifier circuit for rectifying the detection signal produced from said knocking detector, a knocking decision level producing circuit for producing a knocking level by integrating and amplifying the rectification signal from said rectifier circuit and adding a predetermined offset voltage thereto, and a comparator circuit for comparing the knocking level produced from said decision level producing circuit with the rectification signal produced from said rectifier circuit and generating a knocking signal, a retard amount changing circuit for changing the retard amount for each knocking in response to said knocking signal produced from said knocking detector circuit in accordance with the intensity thereof, a retard amount computing circuit for computing a retard amount behind a basic ignition timing in response to a retard amount signal produced from said retard amount changing circuit, and an ignition timing computing circuit for determining the actual ignition timing by subtracting the retard amount produced by said retard amount computing circuit from said basic ignition timing.

3. An ignition timing control system comprising:

a knocking detector for detecting an engine knocking and;

an electronic control unit for controlling the ignition timing from a detection signal produced by said knocking detector, said control unit discriminating the intensity of knock from the detection signal, said control unit further discriminating the interval between occurring knocks, and said control unit still further varying the retard angle amount per one knocking in accordance with both of said discriminating results, said control unit comprising:

a knocking detector circuit for detecting the presence and absence of a knocking and the intensity thereof in response to a detection signal produced from said knocking detector, a retard amount changing circuit for changing the retard amount for each knocking in response to a knocking signal produced from said knocking detector circuit in accordance with the intensity thereof, said retard amount changing circuit including a monostable circuit triggered by said knocking signal produced from said knocking detector circuit for generating a pulse signal having a predetermined time duration, first switch means turned on and off for said predetermined time duration in response to the pulse signal from said monostable circuit, said first switch means having a charging constant current source, a capacitor adapted to be charged from said charging constant current source when said first switch means is turned on, a comparator for comparing the charge voltage of said capacitor with a threshold level and generating a timer signal having a predetermined duration, and second switch means adapted to be turned on and off in response to the timer signal produced from said comparator, said second switch means having first and second charging constant current sources, a retard amount computing circuit for computing a retard amount behind a basic ignition timing in response to a retard amount signal produced from said retard amount changing circuit, and an ignition timing computing circuit for determining the actual ignition timing by subtracting the retard amount produced by said retard amount computing circuit from said basic ignition timing.

4. A system according to claim 3, wherein said retard amount computing circuit includes switch means adapted to be turned on and off in response to a pulse signal produced from said knocking detector circuit, and a capacitor adapted to be charged by selected one of said first and second charging constant current sources of said retard amount changing circuit thereby to provide a predetermined retard amount when said switch means is turned on.

5. An ignition timing control system comprising:

a knocking detector for detecting an engine knocking and;

an electronic control unit for controlling the ignition timing from a detection signal produced by said knocking detector, said control unit discriminating the intensity of knock from the detection signal, said control unit further discriminating the interval between occurring knocks, and said control unit still further varying the retard angle amount per one knocking in accordance with both of said discriminating results, said control unit comprising:

a knocking detector circuit for detecting the presence and absence of a knocking and the intensity thereof in response to a detection signal produced from said knocking detector, a retard amount changing circuit for changing the retard amount for each knocking in response to a knocking signal produced from said knocking detector circuit in accordance with the intensity thereof, said retard amount changing circuit including a monostable circuit adapted to be triggered by the knocking signal produced from said knocking detection circuit and producing a pulse signal having a predetermined duration, a counter adapted to be reset by the pulse signal produced from said monostable circuit and supplied with a basic ignition timing clock signal from said distributor, a flip-flop circuit adapted to be set by the pulse signal produced from said monostable circuit and reset by a predetermined count signal produced from said counter, and switch means adapted to be turned on and off by a timer signal having a predetermined duration produced from said flip-flop circuit, said switch means having first and second changing constant current sources, a retard amount computing circuit for computing a retard amount behind a basic ignition timing in response to a retard amount signal produced from said retard amount changing circuit, and an ignition timing computing circuit for determining the actual ignition timing by subtracting the retard amount produced by said retard amount computing circuit from said basic ignition timing.

* * * * *